July 12, 1949.                J. F. GRUBEN                2,475,704
                        POLARIZING ANTIGLARE SHIELD
                           Filed July 25, 1947

INVENTOR.
JAMES F. GRUBEN
BY
McMorrow, Berman & Davidson
Attorneys

Patented July 12, 1949

2,475,704

UNITED STATES PATENT OFFICE 2,475,704

POLARIZING ANTIGLARE SHIELD

James F. Gruben, Roby, Tex.

Application July 25, 1947, Serial No. 763,495

1 Claim. (Cl. 88—65)

This invention relates to light polarizing shields primarily intended to reduce glare and eye strain for vehicle drivers and for this purpose the shields are adapted to be mounted on the inside of the windshields (or other desirable places) and so situated that the views mostly seen by the drivers are seen through the light polarizing shield.

A particular object of the invention resides in improved mounting means for the shield and simplified adjustment thereof whereby the driver may adjust it for a minimum of glare under various light conditions.

Further objects of the invention will be apparent from the following description of a satisfactory embodiment thereof in detail, reference being made to the accompanying drawings forming a part of this application.

In the drawings:

Figure 2 is an edge elevation thereof illustrating the manner of mounting of the shield on a windshield or the like.

Figure 1:
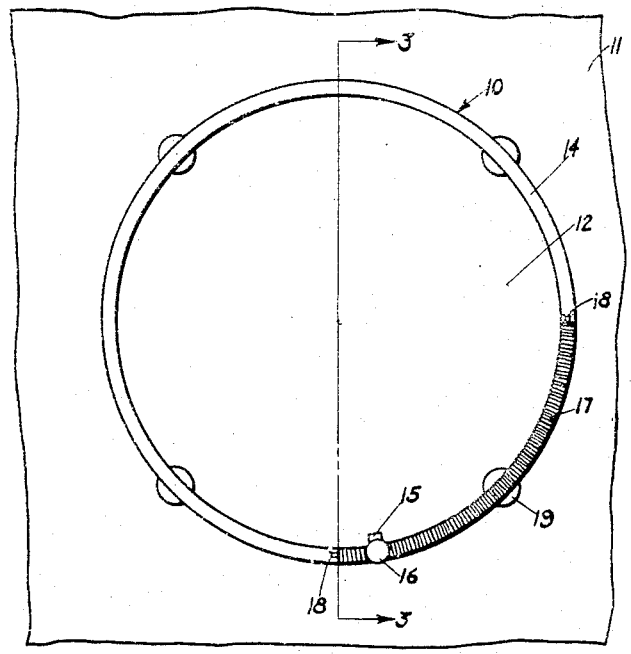
Figure 1 is an elevation of the back of a light polarizing shield in accordance with my invention.
Figure 2:
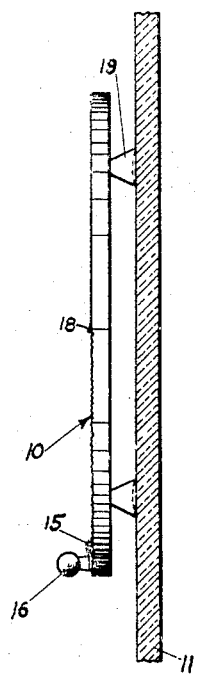
Figure 3:
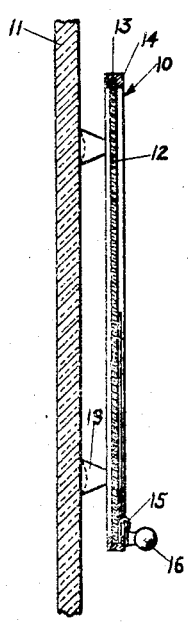
Figure 3 is a vertical sectional view thereof taken on line 3—3 of Figure 1.
Figure 4:
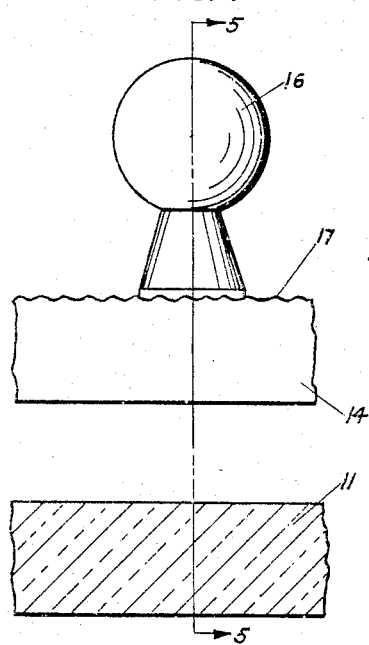
Figure 4 is a fragmentary enlarged edge view showing the adjusting knob for the light polarizing shield.
Figure 5:
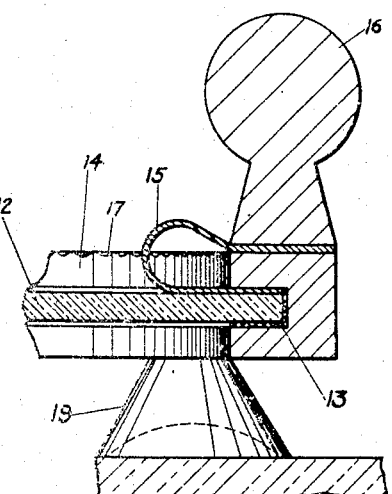
Figure 5 is another fragmentary sectional view thereof taken on line 5—5 of Figure 4.

Referring to the drawings, in Figure 1, I have shown a light polarizing shield 10 as applied to the back of a pane of glass 11 such as an automobile windshield, for use by an automobile driver.

The shield 10 consists of a circular disk of light polarizing material 12 mounted in a groove 13 of a circular frame 14 so as to be rotatable therein. For rotating the filter disk 12 through an arc of 90 degrees a spring or clip 15 is secured to the filter disk and extends outward and up over the frame rim 14 and on the outer end thereof an operating knob 16 is secured. A corresponding 90 degree segment 17 of rim 14 is serrated or ribbed for engagement with the under portion of spring 15 whereby the filter disk 12 is maintained in any desired adjusted position and prevented from being rotated by vibration. Stops 18 at the ends of the serrated segment 17 limit the rotation of filter disk 12 to the 90 degree arc.

Light polarizing shield 10 is preferably mounted on the vehicle windshield 11 by means of several suction cups 19 of rubber of the like which are attached to the forward side of frame 14 so that the shield is quickly and easily mountable at any desired position on the windshield or any other desired place for use.

Having described a highly satisfactory embodiment of my polarized glare shield as a preferred form of my invention, what I claim as new and desire to secure by Letters Patent is:

A light polarizing shield for use on the inner side of an automobile windshield and the like, said shield comprising an annular frame adapted to be positioned parallel to the rear surface of the windshield, means on said frame for securing said frame to the inner surface of said windshield, said annular frame being formed in its radially inward surface with an annular groove, a disk made of light polarizing material positioned within said frame with its peripheral edge confined in said groove whereby said disk is rotatably mounted on said frame, there being radial serrations on the rearward face of said annular frame, a spring clip fixed on said disk having a portion overlying and yieldably engaging said serrations whereby said disk is normally prevented from rotating relative to said frame, and a handle on said portion of said spring clip enabling manually withdrawing said portion of said spring clip from engagement with said serrations and rotating said disk to a desired position relative to said annular frame.

JAMES F. GRUBEN.

REFERENCES CITED

The following references are of record in the file of this patent:

UNITED STATES PATENTS

| Number | Name | Date |
|---|---|---|
| 946,679 | Marks | Jan. 18, 1910 |
| 1,920,185 | Carr | Aug. 1, 1933 |
| 2,298,059 | Land | Oct. 6, 1942 |
| 2,304,504 | Metzger et al. | Dec. 8, 1942 |

FOREIGN PATENTS

| Number | Country | Date |
|---|---|---|
| 482,331 | Great Britain | Mar. 28, 1938 |